(12) United States Patent
Morgan et al.

(10) Patent No.: US 11,141,952 B2
(45) Date of Patent: Oct. 12, 2021

(54) SLUDGE COVERS, SLUDGE MANAGEMENT SYSTEMS, AND RELATED METHODS

(71) Applicant: Industrial & Environmental Concepts, Inc., Edina, MN (US)

(72) Inventors: Michael Allan Morgan, Edina, MN (US); Michael Sean Gallant, Edina, MN (US)

(73) Assignee: Industrial & Environmental Concepts, Inc., Edina, MN (US)

( * ) Notice: Subject to any disclaimer, the term of this patent is extended or adjusted under 35 U.S.C. 154(b) by 535 days.

(21) Appl. No.: 15/092,560

(22) Filed: Apr. 6, 2016

(65) Prior Publication Data

US 2016/0288452 A1 Oct. 6, 2016

Related U.S. Application Data (60) Provisional application No. 62/143,512, filed on Apr. 6, 2015.

(51) Int. Cl.
*B32B 5/02* (2006.01)
*B32B 1/08* (2006.01)
(Continued)

(52) U.S. Cl.
CPC ............ *B32B 5/028* (2013.01); *B32B 1/08* (2013.01); *B32B 3/08* (2013.01); *B32B 5/022* (2013.01); *B32B 5/024* (2013.01); *B32B 5/18* (2013.01); *B32B 5/245* (2013.01); *B32B 5/26* (2013.01); *B32B 7/08* (2013.01); *B32B 7/12* (2013.01); *B32B 25/045* (2013.01); *B32B 25/14* (2013.01);
(Continued)

(58) Field of Classification Search
CPC ... C02F 1/00; B32B 2266/06; B32B 2266/08; B32B 2307/7265; B32B 25/045; B32B 25/065; B32B 5/028; B32B 3/266; B32B 5/18; B32B 5/245; B32B 5/024; B32B 5/26; B32B 2419/00; B32B 2471/00; B32B 7/08; B32B 7/12; Y10S 273/13; E01C 13/08
USPC ................ 428/17, 95, 36, 137; 273/DIG. 13
See application file for complete search history.

(56) References Cited

U.S. PATENT DOCUMENTS 836,326 A 11/1906 Kinyon
2,700,633 A 1/1955 Bovenkerk
(Continued)

FOREIGN PATENT DOCUMENTS

CA 1253266 4/1989
CA 2060479 8/1992
(Continued)

OTHER PUBLICATIONS

"Proposals for Pond Membrane," Nov. 8, 1984.
(Continued)

*Primary Examiner* — Camie S Thompson
(74) *Attorney, Agent, or Firm* — Norton Rose Fulbright US LLP (57) ABSTRACT

This disclosure includes sludge covers, sludge management systems, and related methods. Some sludge covers use or include a mesh layer configured to be disposed over sludge and/or a supportive layer configured to be disposed over sludge and, if present, the mesh layer, and a substantially fluid-impermeable layer configured to be disposed over the mesh layer, if present, and the supportive layer, if present.

10 Claims, 5 Drawing Sheets

(51) Int. Cl.
  *B32B 5/18* (2006.01)
  *B32B 5/24* (2006.01)
  *B32B 3/08* (2006.01)
  *B32B 25/04* (2006.01)
  *B32B 27/32* (2006.01)
  *B32B 7/12* (2006.01)
  *B32B 27/30* (2006.01)
  *B32B 27/06* (2006.01)
  *B32B 5/26* (2006.01)
  *B32B 7/08* (2019.01)
  *B32B 25/14* (2006.01)

(52) U.S. Cl.
  CPC ........... *B32B 27/065* (2013.01); *B32B 27/304* (2013.01); *B32B 27/32* (2013.01); *B32B 2262/0238* (2013.01); *B32B 2262/0253* (2013.01); *B32B 2262/0276* (2013.01); *B32B 2266/0228* (2013.01); *B32B 2266/06* (2013.01); *B32B 2266/08* (2013.01); *B32B 2307/7265* (2013.01); *B32B 2419/00* (2013.01); *B32B 2471/00* (2013.01)

(56) References Cited

U.S. PATENT DOCUMENTS

| | | |
|---|---|---|
| 2,927,626 A | 3/1960 | Corwin et al. |
| 2,952,024 A | 9/1960 | Bartolucci et al. |
| 3,004,769 A | 10/1961 | Turner |
| 3,104,775 A | 9/1963 | Champagnat |
| 3,148,384 A | 9/1964 | Bartolucci |
| 3,313,443 A | 4/1967 | Dial et al. |
| 3,330,118 A | 7/1967 | Biais |
| 3,355,745 A | 12/1967 | Jannuzzi |
| 3,374,918 A | 3/1968 | Creith |
| 3,420,022 A | 1/1969 | Brock |
| 3,462,040 A | 8/1969 | Galloway |
| 3,572,506 A | 3/1971 | Bandy et al. |
| 3,683,428 A | 8/1972 | Morris |
| 3,862,876 A | 1/1975 | Graves |
| 3,879,775 A | 4/1975 | Iwata |
| 3,933,628 A | 1/1976 | Varani |
| 3,943,721 A | 3/1976 | Azalbert et al. |
| 3,980,199 A | 9/1976 | Kays |
| 3,991,900 A | 11/1976 | Burke et al. |
| 4,038,447 A | 7/1977 | Brock |
| 4,135,257 A | 1/1979 | Lof |
| 4,137,575 A | 2/1979 | Klaffke et al. |
| 4,139,117 A | 2/1979 | Dial |
| 4,169,050 A | 9/1979 | Serfling et al. |
| 4,192,025 A | 3/1980 | Hinsperger |
| 4,197,595 A | 4/1980 | Dearing |
| 4,244,819 A | 1/1981 | Ballu |
| 4,294,589 A | 10/1981 | Zachary |
| 4,438,863 A | 3/1984 | Wilson et al. |
| 4,503,988 A | 3/1985 | Gerber |
| 4,546,880 A | 10/1985 | Reese |
| 4,590,714 A | 5/1986 | Walker |
| 4,603,790 A | 8/1986 | Gerber |
| 4,620,396 A | 11/1986 | Bjorntwedt |
| 4,672,691 A | 6/1987 | De Garie et al. |
| 4,678,375 A | 7/1987 | Gagle et al. |
| 4,749,606 A | 6/1988 | Moore |
| 4,780,351 A | 10/1988 | Czempoyesh |
| 4,916,937 A | 4/1990 | Robertson et al. |
| 4,946,719 A * | 8/1990 | Dempsey ................. B32B 7/02 428/17 |
| 4,985,106 A | 1/1991 | Nelson |
| 4,988,406 A | 1/1991 | Nelson |
| 5,022,101 A | 6/1991 | Gosselin et al. |
| 5,044,016 A | 9/1991 | Coombs |
| 5,050,341 A | 9/1991 | Breezer et al. |
| 5,067,182 A | 11/1991 | Koelsch |
| 5,074,427 A | 12/1991 | Siemerink et al. |
| 5,197,239 A | 3/1993 | Glynn et al. |
| 5,265,976 A | 11/1993 | Russell |
| 5,400,549 A | 3/1995 | Morgan |
| 5,468,392 A | 11/1995 | Hanson et al. |
| 5,505,848 A | 4/1996 | Landine et al. |
| 5,546,615 A | 8/1996 | Chamness |
| 5,562,759 A | 10/1996 | Morgan et al. |
| 5,587,080 A | 12/1996 | Landine et al. |
| 5,652,972 A | 8/1997 | Chartrand |
| 5,690,448 A | 11/1997 | Fasullo et al. |
| 5,806,252 A | 9/1998 | Scuero |
| 5,861,095 A | 1/1999 | Vogel et al. |
| 6,047,415 A | 4/2000 | Brown |
| 6,136,194 A | 10/2000 | Vogel et al. |
| 6,505,445 B2 | 1/2003 | Johnson et al. |
| 6,508,247 B1 | 1/2003 | Karales |
| 6,558,548 B2 | 5/2003 | Svirklys et al. |
| 6,851,891 B2 | 2/2005 | Baumgartner et al. |
| 6,855,253 B2 | 2/2005 | Baumgartner et al. |
| 6,905,602 B1 | 6/2005 | Dobie et al. |
| 7,374,059 B2 | 5/2008 | Morgan et al. |
| 7,682,105 B2 | 3/2010 | Ayers et al. |
| 7,727,397 B2 | 6/2010 | Gerardi et al. |
| RE41,442 E | 7/2010 | Morgan et al. |
| 2003/0066789 A1 | 4/2003 | Morgan et al. |
| 2003/0070365 A1 | 4/2003 | Martin |
| 2009/0321351 A1 | 12/2009 | Young |

FOREIGN PATENT DOCUMENTS

| | | |
|---|---|---|
| CA | 2096852 | 8/1992 |
| CA | 2116354 | 2/1994 |
| CA | 2102590 | 5/1994 |
| CA | 2173831 | 4/1995 |
| CA | 2326002 | 10/1999 |
| CA | 2323818 | 5/2001 |
| DE | 2004656 | 8/1971 |
| WO | WO 1993/11330 | 6/1993 |

OTHER PUBLICATIONS

Lemna brochure published more than one year prior to the filing date of this application.

Cross-sectional depictions of portions of subjects of photographs taken on Oct. 6, 2000.

Depiction of structure used in public more than one year prior to the filing of this application.

Parsons, "On-farm biogas production," Cooperative Extension. Northeast Regional Agricultural Engineering Service, 1984.

Photographs taken on Oct. 6, 2000; labeling described in attached Information Disclosure Statement Transmittal Letter Filed on Feb. 4, 2004.

* cited by examiner

SLUDGE COVERS, SLUDGE MANAGEMENT SYSTEMS, AND RELATED METHODS

CROSS-REFERENCE TO RELATED APPLICATIONS

This application claims priority to U.S. Provisional Application No. 62/143,512, filed on Apr. 6, 2015 and entitled "SLUDGE COVERS, SLUDGE MANAGEMENT SYSTEMS, AND RELATED METHODS," the entire content of which is incorporated by reference herein.

BACKGROUND

1. Field of Invention

The present invention relates generally to waste management, and more specifically, but not by way of limitation, to covers and/or waste management systems including covers for waste (e.g., sludge).

2. Description of Related Art

Waste covers may be used to seal waste within an area, such as a basin (e.g., for long-term storage). Some such wastes, such as, for example, sludge, may possess both: (1) liquid-like properties that render the wastes unsuitable for traversing on foot, by land-based equipment, and/or the like; and (2) a relatively high viscosity and/or solid-like properties that render the wastes unsuitable for traversing by floating platform, by barge, and/or the like. Such wastes may thus frustrate, if not prohibit, the installation of a traditional waste cover (e.g., where the traditional waste cover is pulled over a surface of the waste).

Examples of waste covers are disclosed in U.S. Patent Nos.: (1) U.S. Pat. No. 7,682,105 and (2) U.S. Pat. No. 5,690,448.

SUMMARY

Some embodiments of the present covers and/or systems are configured, through a mesh layer configured to be disposed over sludge, to facilitate disposal of a supportive layer over the sludge (e.g., by providing a suitable working and/or walking surface from which to dispose the supportive layer over the sludge). Some embodiments of the present covers and/or systems are configured, through a supportive layer configured to be disposed over sludge (e.g., and, if present, over a mesh layer), to facilitate disposal of a substantially fluid-impermeable layer over the sludge (e.g., by providing a suitable working and/or walking surface from which to dispose the substantially fluid-impermeable layer over the sludge).

Some embodiments of the present sludge covers comprise: a mesh layer configured to be disposed over or disposed over sludge, a supportive layer configured to be disposed over or disposed over the mesh layer, and a substantially fluid-impermeable layer configured to be disposed over or disposed over the supportive layer. As used in this disclosure, a first structure (e.g., layer, panel, and/or the like) disposed over or overlying a second structure (e.g., layer, panel, and/or the like) or a second structure (e.g., layer, panel, and/or the like) disposed under or underlying a first structure (e.g., layer, panel, and/or the like) means that at least a portion of the second structure is underneath, but not necessarily in contact with, at least a portion of the first structure. In some embodiments, at least a portion of (e.g., up to and including all of) the supportive layer is in contact with or is within 0.05, 0.10, 0.20, 0.30, 0.40, 0.50, 1.00, 1.50, or 2.00 meters (m) of a respective underlying portion of the mesh layer. In some embodiments, the supportive layer overlies at least a majority of (e.g., up to and including all of) the mesh layer. In some embodiments, at least a portion of (e.g., up to and including all of) the substantially fluid-impermeable layer is in contact with or is within 0.05, 0.10, 0.20, 0.30, 0.40, 0.50, 1.00, 1.50, or 2.00 m of a respective underlying portion of the supportive layer. In some embodiments, the substantially fluid-impermeable layer overlies at least a majority of (e.g., up to and including all of) the supportive layer.

In some embodiments, the mesh layer comprises a plurality of mesh panels configured to be coupled together. In some embodiments, the supportive layer comprises a plurality of supportive panels configured to be coupled together. In some embodiments, the substantially fluid-impermeable layer comprises a plurality of substantially fluid-impermeable panels configured to be coupled together. In at least some embodiments, a panel of a layer may be characterized as a section of the layer.

In some embodiments, the supportive layer defines one or more closed cells. Some embodiments comprise foam disposed within at least one of the one or more closed cells of the supportive layer.

Some embodiments of the present sludge management systems comprise: a sludge cover comprising a mesh layer configured to be disposed over the sludge, a supportive layer disposed over the mesh layer, and a substantially fluid-impermeable layer disposed over the supportive layer. In some embodiments, the sludge cover defines one or more fluid passageways between the supportive layer and the substantially fluid-impermeable layer.

In some embodiments, the mesh layer of the sludge cover is defined by a plurality of mesh panels coupled together. In some embodiments, the supportive layer of the sludge cover is defined by a plurality of supportive panels coupled together. In some embodiments, the substantially fluid-impermeable layer of the sludge cover is defined by a plurality of substantially fluid-impermeable panels coupled together.

In some embodiments, the supportive layer of the sludge cover defines one or more closed cells. Some embodiments comprise foam disposed within at least one of the one or more closed cells of the supportive layer of the sludge cover.

In some embodiments, the sludge cover comprises one or more supports disposed between the supportive layer and the substantially fluid-impermeable layer. In some embodiments, at least one of the one or more fluid passageways is defined by a least one of the one or more supports. In some embodiments, at least one of the one or more supports comprises foam. In some embodiments, at least one of the one or more supports is at least partially surrounded by a substantially fluid-impermeable membrane, such as, for example, a geomembrane.

In some embodiments, the sludge cover comprises one or more pipes disposed between the supportive layer and the substantially fluid-impermeable layer, and at least one of the one or more fluid passageways is defined by at least one of the one or more pipes. In some embodiments, at least one of the one or more pipes is perforated. In some embodiments, at least one of the one or more pipes is corrugated.

In some embodiments, the sludge cover comprises a central region surrounded by a perimeter region, and the one or more fluid passageways comprises a first fluid passageway and a second fluid passageway, each extending from the central region and through the perimeter region, where the first fluid passageway is angularly disposed relative to the second fluid passageway. In some embodiments, the sludge cover comprises a first edge and a second edge opposite the first edge, and at least one of the one or more fluid passageways extends between the first edge and the second edge. Some embodiments comprise one or more blowers, where each blower is configured to encourage fluid communication through at least one of the one or more fluid passageways.

In some embodiments, the substantially fluid-impermeable layer defines one or more fluid channels. Some embodiments comprise one or more weights, where the one or more weights are coupled to the substantially fluid-impermeable layer such that the substantially fluid-impermeable layer defines the one or more fluid channels. Some embodiments comprise one or more sumps, where each of the one or more sumps is in fluid communication with at least one of the one or more fluid channels. Some embodiments comprise one or more drains, where each of the one or more drains is in fluid communication with at least one of the one or more fluid channels.

Some embodiments of the present methods for covering sludge comprise: disposing a plurality of supportive panels over the sludge, coupling the plurality of supportive panels together to define a supportive layer, and disposing a substantially fluid-impermeable layer over the supportive layer such that the substantially fluid-impermeable layer overlies at least two of the plurality of supportive panels.

Some embodiments comprise fastening at least one of the plurality of supportive panels to at least one other of the plurality of supportive panels. Some embodiments comprise welding at least one of the plurality of supportive panels to at least one other of the plurality of supportive panels.

In some embodiments, disposing the substantially fluid-impermeable layer over the supportive layer comprises disposing a plurality of substantially fluid-impermeable panels over the supportive layer and coupling the plurality of substantially fluid-impermeable panels together to define the substantially fluid-impermeable layer. Some embodiments comprise welding at least one of the plurality of substantially fluid-impermeable panels to at least one other of the plurality of substantially fluid-impermeable panels.

Some embodiments comprise disposing a plurality of mesh panels over the sludge and coupling the plurality of mesh panels together to define a mesh layer. In some embodiments, coupling the plurality of mesh panels together is such that each of the plurality of mesh panels overlaps at least one other of the plurality of mesh panels. Some embodiments comprise fastening at least one of the plurality of mesh panels to at least one other of the plurality of mesh panels. Some embodiments comprise welding at least one of the plurality of mesh panels to at least one other of the plurality of mesh panels.

In some embodiments, disposing the substantially fluid-impermeable layer over the supportive layer is such that one or more fluid passageways is defined between the supportive layer and the substantially fluid-impermeable layer. Some embodiments comprise applying suction to at least one of the one or more fluid passageways. In some embodiments, disposing the substantially fluid-impermeable layer over the supportive layer is such that one or more fluid channels is defined by the substantially fluid-impermeable layer.

Some embodiments comprise coupling one or more supports to the supportive layer. Some embodiments comprise coupling one or more pipes to the supportive layer. Some embodiments comprise coupling one or more weights to the substantially fluid-impermeable layer.

Some embodiments of the present sludge covers comprise: a mesh layer configured to be disposed over sludge, a supportive layer configured to be disposed over the mesh layer, and a substantially fluid-impermeable layer configured to be disposed over the supportive layer. In some embodiments, the supportive layer is disposed over the mesh layer and the substantially fluid-impermeable layer is disposed over the supportive layer.

In some embodiments, the supportive layer comprises a plurality of supportive panels. In some embodiments, the supportive layer comprises foam. In some embodiments, the supporting layer defines one or more cells, at least one of the one or more cells containing foam. In some embodiments, the substantially fluid-impermeable layer comprises a geomembrane.

Some embodiments comprise one or more supports or pipes disposed beneath the substantially fluid-impermeable layer such that the one or more supports or pipes define one or more fluid passageways beneath the substantially fluid-impermeable layer. In some embodiments, at least one of the one or more supports or pipes comprises a support including foam surrounded by a geomembrane. Some embodiments comprise one or more weights placed on top of the substantially fluid-impermeable layer such that the substantially fluid-impermeable layer defines one or more fluid channels.

Some embodiments of the present sludge covers comprise: a supportive layer configured to be disposed over sludge, the supportive layer including a plurality of supportive panels, each comprising foam, and a substantially fluid-impermeable layer configured to be disposed over the supportive layer. Some embodiments comprise a mesh layer configured to be disposed between the sludge and the supportive layer. In some embodiments, the substantially fluid-impermeable layer is disposed over the supportive layer.

In some embodiments, each of the plurality of supportive panels defines one or more cells, at least one of the one or more cells containing foam. In some embodiments, the substantially fluid-impermeable layer comprises a geomembrane. Some embodiments comprise one or more weights placed on top of the substantially fluid-impermeable layer such that the substantially fluid-impermeable layer defines one or more fluid channels.

Some embodiments of the present methods for covering sludge comprise: disposing a plurality of mesh panels over the sludge to define a mesh layer and disposing a substantially fluid-impermeable layer over the mesh layer. Some embodiments comprise disposing a supportive layer over the mesh layer, the supportive layer defining one or more cells, at least one of the one or more cells containing foam, where disposing the substantially fluid-impermeable layer over the mesh layer is performed such that the substantially fluid-impermeable layer is disposed over the supportive layer.

In some embodiments, disposing the supportive layer over the mesh layer comprises disposing a plurality of supportive panels, each defining at least one of the one or more cells, over the mesh layer to define the supportive layer. In some embodiments, disposing the substantially fluid-impermeable layer over the mesh layer comprises disposing a plurality of substantially fluid-impermeable panels over the supportive layer to define the substantially fluid-impermeable layer. In some embodiments, the substantially fluid-impermeable layer comprises a geomembrane.

Some embodiments of the present sludge covers comprise a mesh layer configured to be disposed over sludge and/or a supportive layer configured to be disposed over sludge, and, if present, the mesh layer, the supportive layer optionally comprising foam and optionally defining one or more cells, where foam is optionally disposed within at least one of the one or more cells, and a substantially fluid-impermeable layer configured to be disposed over the mesh layer, if present, and the supportive layer, if present, the substantially fluid-impermeable layer optionally comprising a geomembrane.

Some embodiments of the present methods for covering sludge comprise disposing a mesh layer over the sludge and/or disposing a supportive layer over the sludge, and, if present, the mesh layer, the supportive layer optionally comprising foam and optionally defining one or more cells, where foam is optionally disposed within at least one of the one or more cells, and disposing a substantially fluid-impermeable layer over the mesh layer, if present, and over the supportive layer, if present, the substantially fluid-impermeable layer optionally comprising a geomembrane.

The term "coupled" is defined as connected, although not necessarily directly and not necessarily mechanically; two items that are "coupled" may be unitary with each other. The terms "a" and "an" are defined as one or more unless this disclosure explicitly requires otherwise. The term "substantially" is defined as largely, but not necessarily wholly, what is specified (and includes what is specified; e.g., substantially 90 degrees includes 90 degrees and substantially parallel includes parallel), as understood by a person of ordinary skill in the art. In any disclosed embodiment, the terms "substantially" and "approximately" and may be substituted with "within [a percentage] of" what is specified, where the percentage includes 0.1, 1, 5, and 10 percent.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, an apparatus that "comprises," "has," "includes," or "contains" one or more elements possesses those one or more elements, but is not limited to possessing only those elements. Likewise, a method that "comprises," "has," "includes," or "contains" one or more steps possesses those one or more steps, but is not limited to possessing only those one or more steps.

Any embodiment of any of the apparatuses, systems, and methods can consist of or consist essentially of—rather than comprise/have/include/contain—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Some details associated with the embodiments are described above and others are described below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are drawn to scale (unless otherwise noted), meaning the sizes of the depicted elements are accurate relative to each other for at least the embodiment depicted in the figures.

DETAILED DESCRIPTION OF ILLUSTRATIVE EMBODIMENTS

Figure 1A:
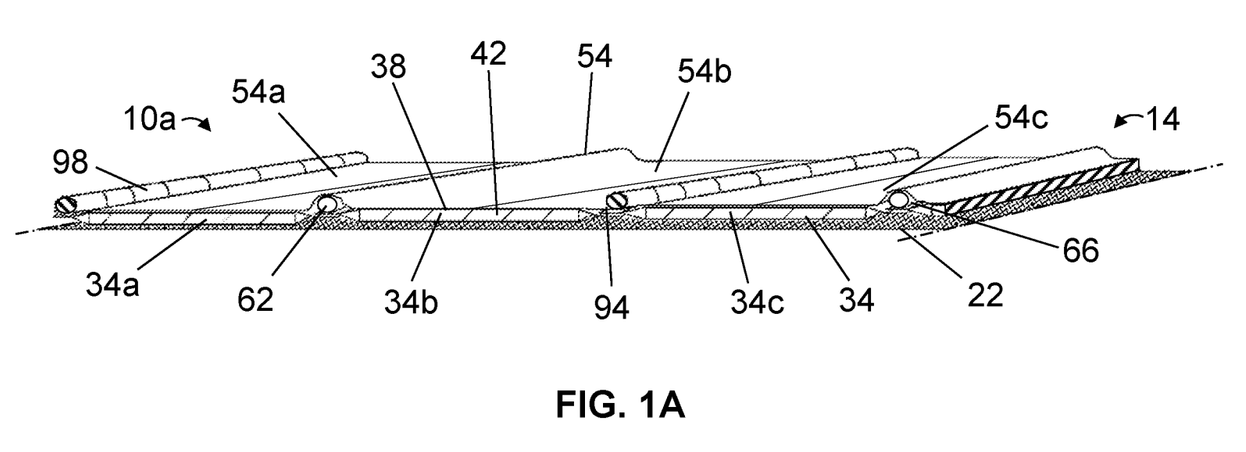
FIG. 1A is a cross-sectional perspective view of a first embodiment of the present sludge management systems.
Figure 1B:
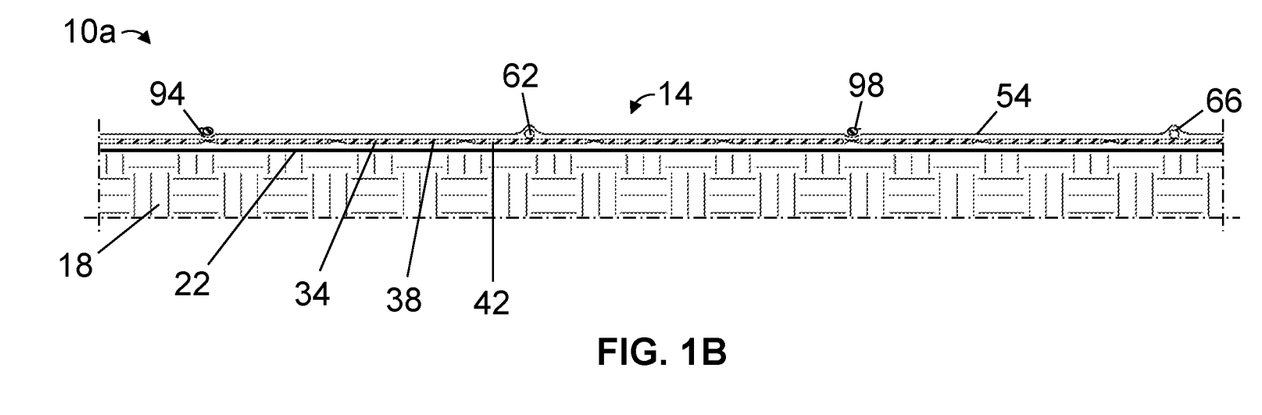
FIG. 1B is a cross-sectional side view of the embodiment of FIG. 1A.
Figure 1C:
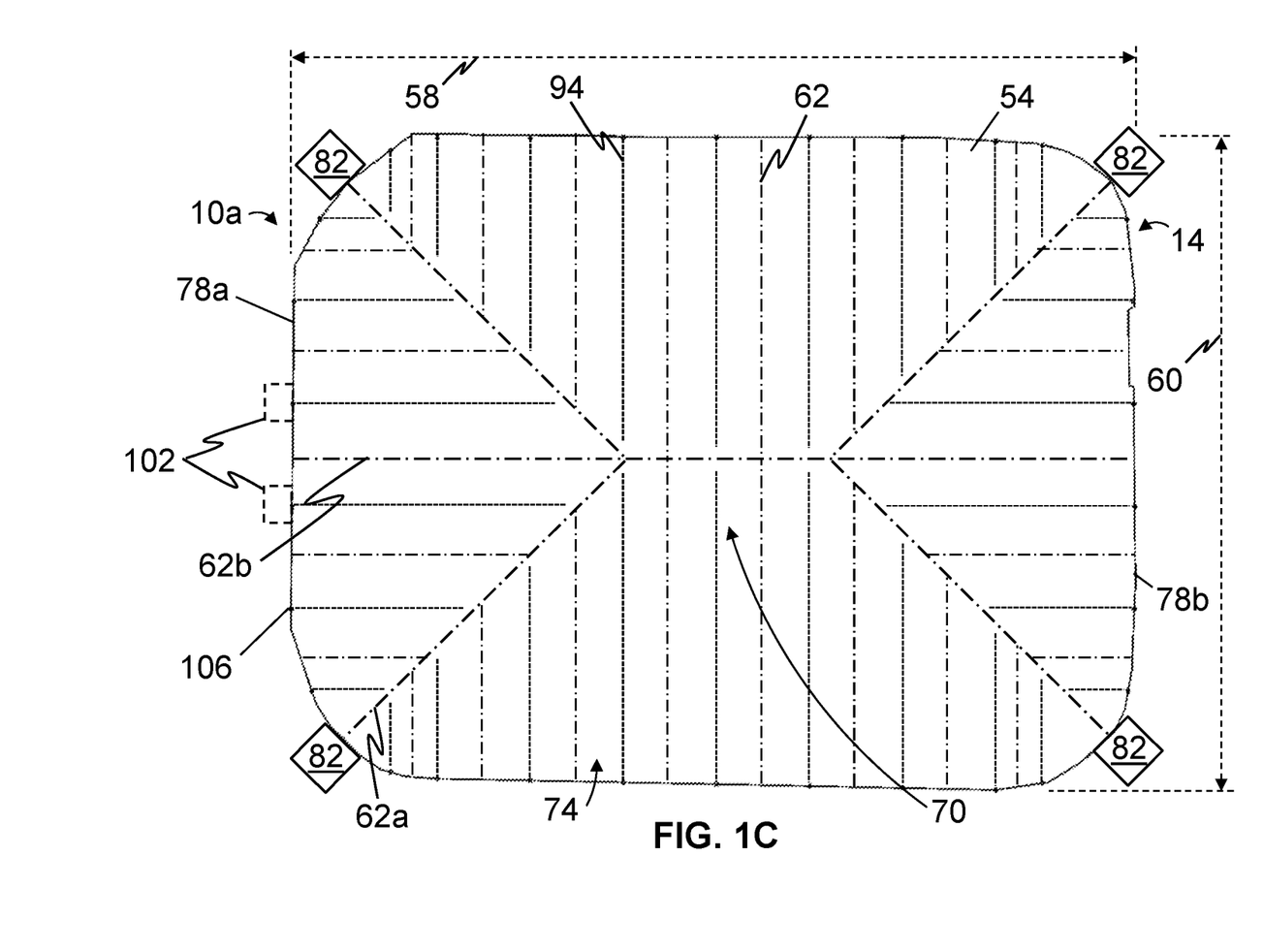
FIG. 1C is a top view of the embodiment of FIG. 1A, with some features depicted schematically.

Referring now to the drawings, and more particularly to FIGS. 1A-1C, shown therein and designated by the reference numeral 10a is a first embodiment of the present sludge management systems. In the embodiment shown, sludge management system 10a comprises a sludge cover 14 configured to cover sludge 18.

Figure 2:
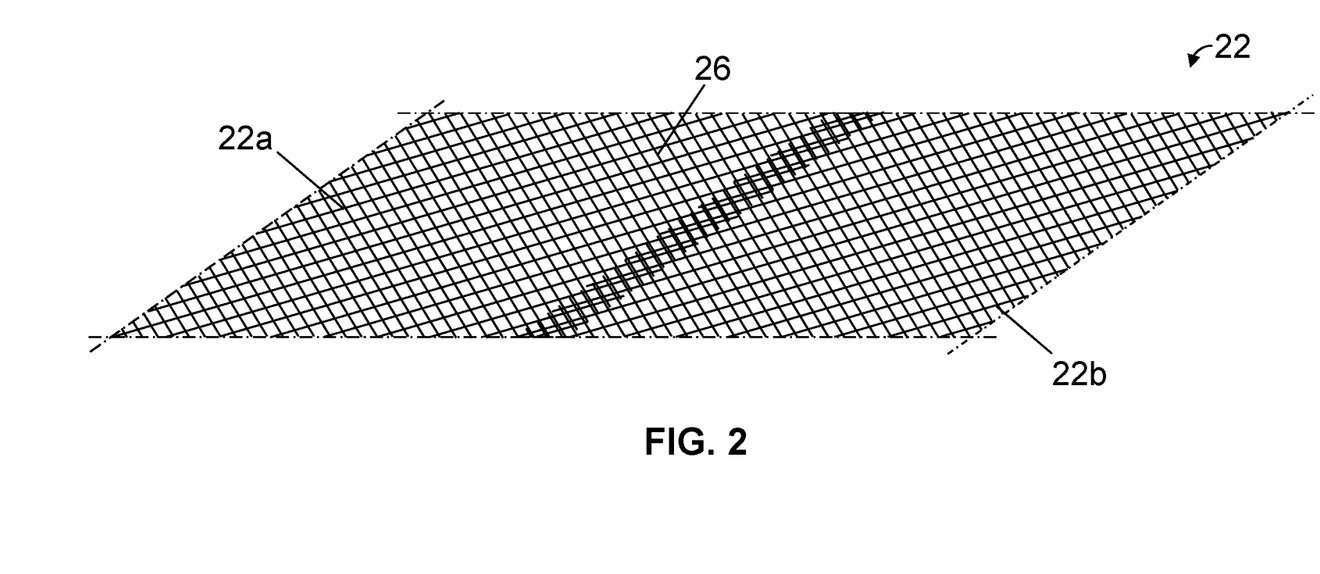
FIG. 2 is a perspective view of a portion of a mesh layer, which may be suitable for use in some embodiments of the present covers and/or systems.

In this embodiment, cover 14 comprises a mesh layer 22 configured to be disposed over (e.g., including submerged and/or partially submerged within) sludge 18. As used in this disclosure, the term "sludge" includes, but is not limited to, compositions of one or more viscous fluids, and such compositions may include solid components. Such a mesh layer (e.g., 22) can include a textile or geotextile (e.g., whether woven or non-woven), a grid or geogrid, a net or geonet, a mat, geomat, or erosion control mat, a web or geoweb, a geocomposite, geocells, and/or the like. In the depicted embodiment, mesh layer 22 comprises high-density polyethylene (HDPE); however, in other embodiments, respective mesh layers (e.g., 22) can comprise any suitable material, such as, for example, linear low-density polyethylene (LLDPE), polyvinyl chloride (PVC), polypropylene (fPP), chlorosulfonated polyethylene (CSPE), ethylene propylene diene terpolymer (EPDM), polyester, and/or the like. In the embodiment shown, mesh layer 22 defines a plurality of openings 26 through the mesh layer (FIG. 2). In this embodiment, each of plurality of openings 26 is generally parallelogram-shaped; however, in other embodiments, openings of respective plurality of openings (e.g., 26) of respective mesh layers (e.g., 22) may comprise any suitable shape, such as, for example, circular, elliptical, and/or otherwise rounded, triangular, square, rectangular, and/or otherwise polygonal, and/or the like. In these ways and others, respective mesh layers (e.g., 22) of the present covers and/or systems may provide a degree of stability to sludge (e.g., by restraining portions of the sludge within respective openings of a respective mesh layer, thereby inhibiting flow of the sludge), provide a suitable working and/or walking surface (e.g., from which to dispose a respective supportive layer 34, a respective substantially fluid-impermeable layer 54, and/or the like over the sludge) and/or the like.

Referring additionally to FIG. 2, in the depicted embodiment, mesh layer 22 comprises a plurality of mesh panels (e.g., 22a, 22b) coupled together or configured to be coupled together. For example, in this embodiment, each of the plurality of mesh panels (e.g., 22a, 22b) comprises a length of approximately 45.7 m and a width of approximately 4.6 m. In the embodiment shown, the plurality of mesh panels (e.g., 22a, 22b) are coupled together or configured to be coupled together such that, for example, each of the plurality of mesh panels overlaps at least one other of the plurality of mesh panels. As "overlap" is used in this disclosure, two panels may each overlap the other (e.g., regardless of which of the two panels is disposed above the other of the two panels). For example, in this embodiment, mesh panel 22a overlaps a portion of mesh panel 22b (e.g., a portion having a width that is greater than any one of or between any two of 7.0, 7.5, 10.0, 12.5, 15.0, 20.0, 25.0, 30.0, 35.0, 40.0, 45.0, 50.0, 55.0, 60.0, 65.0, 70.0, 75.0, 80.0, 85.0, and 90.0 cm, such as, for example, a width from 15 cm to 90 cm, a width from 30 cm to 90 cm, and/or the like), and mesh panel 22b overlaps a portion of mesh panel 22a (e.g., a portion having a width that is greater than any one of or between any two of 7.0, 7.5, 10.0, 12.5, 15.0, 20.0, 25.0, 30.0, 35.0, 40.0, 45.0, 50.0, 55.0, 60.0, 65.0, 70.0, 75.0, 80.0, 85.0, and 90.0 cm, such as, for example, a width from 15 cm to 90 cm, a width from 30 cm to 90 cm, and/or the like). Such coupling together of two or more of the plurality of mesh panels (e.g., 22a, 22b) may be accomplished in any suitable fashion, such as, for example, via fasteners (e.g., zip-ties, nuts and bolts, screws, and/or the like), adhesives, welding, and/or the like. In yet other embodiments, respective mesh layers (e.g., 22) may be formed from mesh panels (e.g., 22a, 22b) that are spaced apart from (e.g., not physically connected to) one another. In yet other embodiments, respective mesh layers (e.g., 22) may be unitary.

For example, some embodiments of the present methods for covering sludge (e.g., 18) comprise disposing a mesh layer (e.g., 22) over the sludge. In some embodiments, disposing the mesh layer over the sludge comprises disposing a plurality of mesh panels (e.g., 22a, 22b) over the sludge. Some methods comprise coupling the plurality of mesh panels together. In some methods, coupling the plurality of mesh panels together is such that each of the plurality of mesh panels overlaps at least one other of the plurality of mesh panels (e.g., as shown in FIG. 2). Some methods comprise fastening at least one of the plurality of mesh panels to at least one other of the plurality of mesh panels. Some methods comprise welding at least one of the plurality of mesh panels to at least one other of the plurality of mesh panels.

In the depicted embodiment, cover 14 comprises a supportive layer 34 disposed over or configured to be disposed over sludge 18 (e.g., and mesh layer 22, if present) (e.g., and secured at one or more edges of the supportive layer, for example, using an anchor trench). Such supportive layers (e.g., 34) can comprise any suitable structure that is capable of providing a working and/or walking surface over sludge (e.g., 18) (e.g., from which to dispose a substantially fluid-impermeable layer 54 and/or the like over the sludge), such as, for example, a structure that is buoyant in the sludge, and the following description of supportive layer 34 is provided only by way of illustration. In the embodiment shown, supportive layer 34 defines one or more cells 38, each of which may be closed or substantially closed (e.g., but not necessarily watertight). In this embodiment, a supportive and/or insulative material, such as, for example, foam 42, is disposed within at least one of one or more cells 38. In the depicted embodiment, foam 42 is at least partially covered and/or at least partially surrounded by a film or membrane 44 (e.g., to mitigate fluid ingress into the foam). In the embodiment shown, supportive layer 34, and more particularly, portions of the supportive layer that define one or more cells 38, comprise HDPE; however; in other embodiments, respective supportive layers (e.g., 34) may comprise any suitable material, such as, for example LLDPE, PVC, fPP, CSPE, EPDM, and/or the like. Respective foam (e.g., 42) of the present covers and/or systems may comprise any suitable foam, such as, for example, expanded polystyrene foam (EPS) and/or the like, whether having a closed-cell and/or open-cell structure. Respective supportive layers (e.g., 34) of the present covers and/or systems may, in addition to providing a suitable working and/or walking surface over sludge (e.g., 18), insulate the sludge (e.g., from an external environment).

Figure 3A:
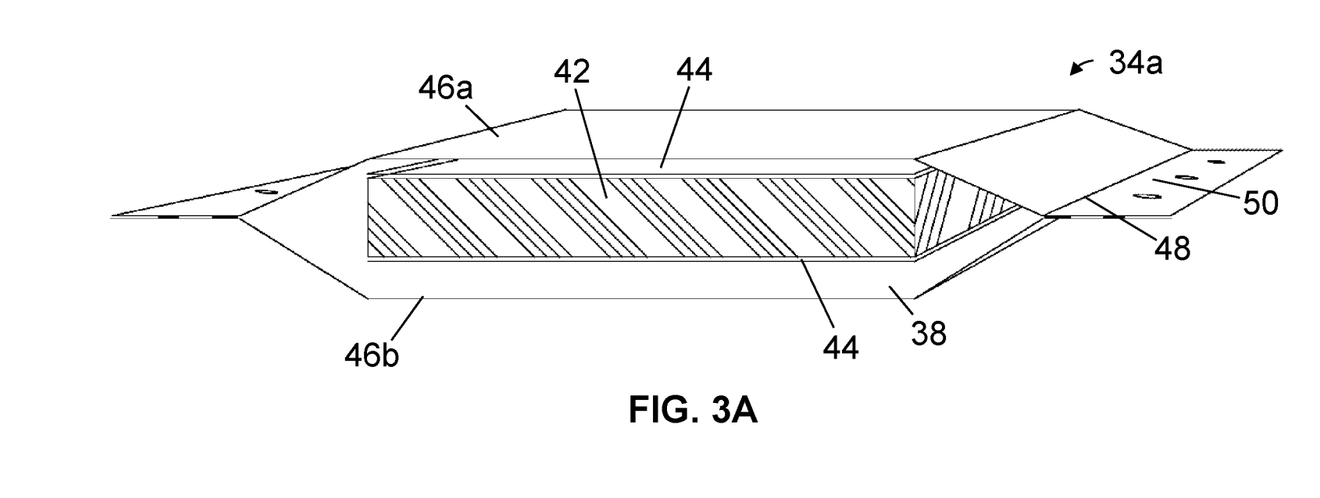
FIGS. 3A and 3B are a cross-sectional perspective view and a cutaway top view, respectively, of a portion of a supportive layer, which may be suitable for use in some embodiments of the present covers and/or systems.
Figure 3B:
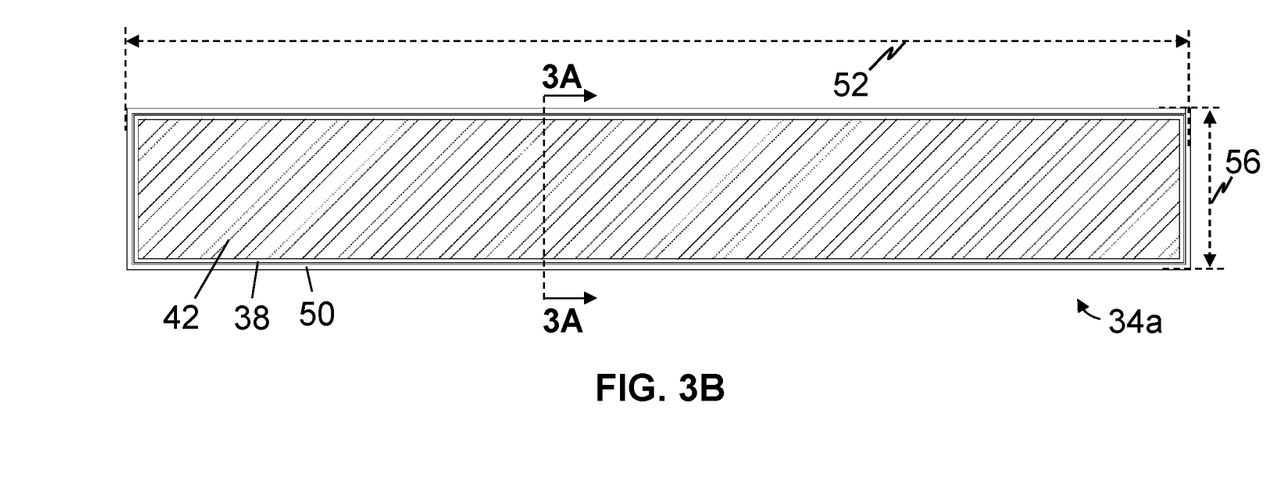

Referring additionally to FIGS. 3A and 3B, in the embodiment shown, supportive layer 34 is defined by a plurality of supportive panels or casings (e.g., 34a, 34b, 34c). For example, in this embodiment, each of the plurality of supportive panels (e.g., 34a, 34b, 34c) comprises an upper layer 46a and a lower layer 46b that are coupled together (e.g., bonded, welded, and/or the like) at a substantially closed perimeter 48 to define one or more of one or more cells 38 between the upper layer and the lower layer. In the depicted embodiment, portions of upper layer 46a and/or lower layer 46b extend laterally outwardly beyond substantially closed perimeter 48 to define one or more flanges 50 (e.g., which may facilitate coupling together of the plurality of supportive panels). In the embodiment shown, each of the plurality of supportive panels (e.g., 34a, 34b, 34c) comprises a length 52 of approximately 15.1 m, and a width 56 of approximately 2.3 m.

Similarly to as described above for the plurality of mesh panels (e.g., 22a, 22b), the plurality of supportive panels (e.g., 34a, 34b, 34c) may be coupled together or be configured to be coupled together such that each of the plurality of supportive panels (e.g., a respective flange 50 thereof) overlaps at least one other of the plurality of supportive panels (e.g., a respective flange 50 thereof) (FIG. 1A). Coupling together of two or more of the plurality of supportive panels (e.g., 34a, 34b, 34c) may be accomplished in any suitable fashion, such as, for example, via fasteners, adhesive, welding (e.g., which may facilitate a sealed or substantially sealed coupling between the two or more of the plurality of supportive panels), and/or the like. In yet other embodiments, respective supportive layers (e.g., 34) may be formed from supportive panels (e.g., 34a, 34b, 34c) that are spaced apart from (e.g., not physically connected to) one another. In yet other embodiments, respective supportive layers (e.g., 34) may be unitary. In some embodiments, a respective supportive layer (e.g., 34) may include one or more sheets or layers of foam (e.g., with each sheet or layer forming a panel of the supportive layer).

For example, some embodiments of the present methods for covering sludge (e.g., 18) comprise disposing a supportive layer (e.g., 34) over the sludge, and, if present, a mesh layer (e.g., 22). In some embodiments, disposing the supportive layer over the sludge comprises disposing a plurality of supportive panels (e.g., 34a, 34b, 34c) over the sludge. Some embodiments comprise coupling the plurality of supportive panels together. Some methods comprise fastening at least one of the plurality of supportive panels to at least one other of the plurality of supportive panels. Some methods comprise welding at least one of the plurality of supportive panels to at least one other of the plurality of supportive panels.

In this embodiment, cover 14 comprises a substantially (e.g., up to and including completely) fluid-impermeable layer 54 (e.g., a geomembrane) disposed over or configured to be disposed over mesh layer 22, if present, and supportive layer 34, if present (e.g., and secured at one or more edges of the substantially fluid-impermeable layer, for example, using an anchor trench). In the depicted embodiment, substantially fluid-impermeable layer 54 comprises HDPE; however, in other embodiments, respective substantially fluid-impermeable layers (e.g., 54) may comprise any suitable material, such as, for example LLDPE, PVC, fPP, CSPE, EPDM, reinforced polypropylene (RPP), CSPE synthetic rubber, and/or the like. Respective fluid-impermeable layers (e.g., 54) of the present covers and/or systems may comprise any suitable thickness, such as, for example, a nominal thickness of approximately 60-80 thousandths of an inch (mils). In these ways and others, respective substantially fluid-impermeable layers (e.g., 54) of the present covers and/or systems may prohibit or substantially prohibit liquid and/or gas (e.g., evaporate, rainwater, snowmelt, and/or the like) ingress into and/or egress from sludge through the respective substantially fluid-impermeable layers and/or the like (e.g., effectively sealing the sludge for long-term storage).

In the embodiment shown, substantially fluid-impermeable layer 54 is defined by a plurality of substantially fluid-impermeable panels (e.g., 54*a*, 54*b*, 54*c*) coupled together or configured to be coupled together. For example, in this embodiment, each of the plurality of substantially fluid-impermeable panels (e.g., 54*a*, 54*b*, 54*c*) comprises a length of approximately 121.9 m (e.g., from 15.0 to 125.0 m) and a width of approximately 6.8 m (e.g., from 2.5 to 35.0 m). Similarly to as described above for the plurality of mesh panels (e.g., 22*a*, 22*b*) and the plurality of supportive panels (e.g., 34*a*, 34*b*, 34*c*), the plurality of substantially fluid-impermeable panels (e.g., 54*a*, 54*b*, 54*c*) may be coupled together or be configured to be coupled together such that each of the plurality of substantially fluid-impermeable panels overlaps at least one other of the plurality of substantially fluid-impermeable panels (e.g., which may enhance fluid-impermeability of substantially fluid-impermeable layer 54). Such coupling together of two or more of the plurality of substantially fluid-impermeable panels (e.g., 54*a*, 54*b*, 54*c*) may be accomplished in any suitable fashion, such as, for example, by welding (e.g., which may facilitate a sealed or substantially sealed coupling between the two or more of the plurality of substantially fluid-impermeable panels). In yet other embodiments, respective substantially fluid-impermeable layers (e.g., 54) may be unitary.

For example, some embodiments of the present methods for covering sludge (e.g., 18) comprise disposing a substantially fluid-impermeable layer (e.g., 54) over a supportive layer (e.g., 34). In some methods, disposing the substantially fluid-impermeable layer over the supportive layer is such that the substantially fluid-impermeable layer overlies at least two of a plurality of supportive panels (e.g., 34*a*, 34*b*, 34*c*) of the supportive layer. Some embodiments of the present methods for covering sludge (e.g., 18) comprise disposing a substantially fluid-impermeable layer (e.g., 54) over a mesh layer (e.g., 22). In some methods, disposing the substantially fluid-impermeable layer (e.g., 54) over the mesh layer is such that the substantially fluid-impermeable layer overlies at least two of a plurality of mesh panels (e.g., 22*a*, 22*b*) of the mesh layer. In some methods, disposing the substantially fluid-impermeable layer over the supportive layer and/or the mesh layer comprises disposing a plurality of substantially fluid-impermeable panels (e.g., 54*a*, 54*b*, 54*c*) over the supportive layer and/or the mesh layer and coupling the plurality of substantially fluid-impermeable panels together. Some methods comprise welding at least one of the plurality of substantially fluid-impermeable panels to at least one other of the plurality of substantially fluid-impermeable panels.

Provided by way of example, in the depicted embodiment, cover 14 has a length 58 of approximately 274.3 m and a width 60 of approximately 213.4 m (FIG. 1C) (e.g., defined by a corresponding length and/or a corresponding width of mesh layer 22, supportive layer 34, and/or substantially fluid-impermeable layer 54). However, the present covers (e.g., 14) may comprise any suitable respective length (e.g., 58) and/or any suitable respective width (e.g., 60), which may be facilitated, at least in part, by a modular and/or panel-based structure of a respective mesh layer (e.g., 22), a respective supportive layer (e.g., 34), and/or a respective substantially fluid-impermeable layer (e.g., 54).

In this embodiment, cover 14 defines one or more fluid passageways 62 beneath substantially fluid-impermeable layer 54. For example, in the depicted embodiment, sludge cover 14 comprises one or more pipes 66 disposed beneath substantially fluid-impermeable layer 54, where at least one of one or more fluid passageways 62 is defined by at least one of the one or more pipes (e.g., within an interior passageway of the at least one of the one or more pipes and/or adjacent to the at least one of the one or more pipes, but outside of the interior passageway of the at least one of the one or more pipes). Pipes of respective one or more pipes (e.g., 66) of the present covers and/or systems may comprise any suitable pipe, such as, for example, perforated pipe, corrugated pipe, and/or the like.

In some embodiments, respective sludge covers (e.g., 14) may comprise one or more supports disposed beneath a respective substantially fluid-impermeable layer (e.g., 54) (e.g., in a same or similar location as one or more pipes 66 in cover 14), where at least one of respective one or more fluid passageways (e.g., 62) is defined by at least one of the one or more supports (e.g., in a volume and/or duct space defined between layers and adjacent the at least one of the one or more supports). In these embodiments, such supports may comprise any suitable material, such as, for example, foam (e.g., EPS), which may be at least partially surrounded by a substantially fluid-impermeable membrane (e.g., a geomembrane). At least through respective one or more fluid passageways (e.g., 62), some embodiments of the present covers and/or systems may be configured to allow gasses (e.g., biogas produced by sludge) to escape from respective portions (e.g., underneath respective layers) of the covers and/or systems (e.g., thus preventing the gasses from lifting and/or otherwise displacing the respective portions and/or the respective layers of the covers and/or the systems).

For example, some embodiments of the present methods for covering sludge comprise disposing a substantially fluid-impermeable layer (e.g., 54) over a mesh layer (e.g., 22) and/or a supportive layer (e.g., 34) such that one or more fluid passageways (e.g., 62) is defined beneath the substantially fluid-impermeable layer. Some methods comprise coupling one or more pipes (e.g., 66) to the mesh layer and/or the supportive layer. Some methods comprise coupling one or more supports to the mesh layer and/or the supportive layer.

In the embodiment shown, cover 14 comprises a central region 70 surrounded by a perimeter region 74 (FIG. 1C). In this embodiment, one or more fluid passageways 62 comprises a first fluid passageway (e.g., 62*a*) and a second fluid passageway (e.g., 62*b*), each extending from central region 70 and through perimeter region 74, where the first fluid passageway is angularly disposed relative to the second fluid passageway (e.g., as shown). In the depicted embodiment, cover 14 comprises a first edge 78*a* and a second edge 78*b* opposite the first edge, and at least one of one or more fluid passageways 62 (e.g., 62*b*) extends between the first edge and the second edge. In this embodiment, at least one of one or more fluid passageways 62 (e.g., 62*a*) is in fluid communication with at least one other of the one or more fluid passageways (e.g., 62*b*).

In the embodiment shown, system 10*a* comprises one or more blowers 82, each configured to encourage fluid communication through at least one of one or more fluid passageways 62. For example, some embodiments of the present methods for covering sludge comprise applying suction (e.g., with at least one of one or more blowers 82) to at least one of one or more fluid passageways (e.g., 62).

In this embodiment, substantially fluid-impermeable layer 54 defines one or more fluid channels 94 (e.g., defined by depressed portions of an upper surface of the substantially fluid-impermeable layer). For example, in the depicted embodiment, system 10*a* comprises one or more weights or ballasts 98, where the one or more weights or ballasts are coupled to substantially fluid-impermeable layer 54 such that the substantially fluid-impermeable layer defines one or more fluid channels 94 (e.g., such that the one or more weights or ballasts each create a depression in a top surface of the substantially fluid-impermeable layer within which fluids may flow). Such one or more weights or ballasts 98 may be coupled to substantially fluid-impermeable layer 54 in any suitable fashion (e.g., by resting one or more of the one or more weights or ballasts on a top surface of the substantially fluid-impermeable layer and/or via fasteners, straps, and/or the like).

In the embodiment shown, system 10*a* comprises one or more sumps 102, where each of the one or more sumps is in fluid communication with at least one of one or more fluid channels 94 (e.g., to collect fluid communicated through the at least one of the one or more fluid channels). In this embodiment, system 10*a* comprises one or more drains 106 (e.g., drop drains), where each of the one or more drains is in fluid communication with at least one of one of one or more fluid channels 94 (e.g., to collect fluid communicated through the at least one of the one or more fluid channels). Some embodiments of the present systems may comprise one or more pumps, which may be configured to encourage fluid communication through at least one of respective one or more fluid channels (e.g., 94).

For example, some embodiments of the present methods for covering sludge comprise disposing a substantially fluid-impermeable layer (e.g., 54) over a supportive layer (e.g., 34) and/or a mesh layer (e.g., 22) such that one or more fluid channels (e.g., 94) is defined by the substantially fluid-impermeable layer. Some methods comprise coupling one or more weights or ballasts to the substantially fluid-impermeable layer.

Figure 4:
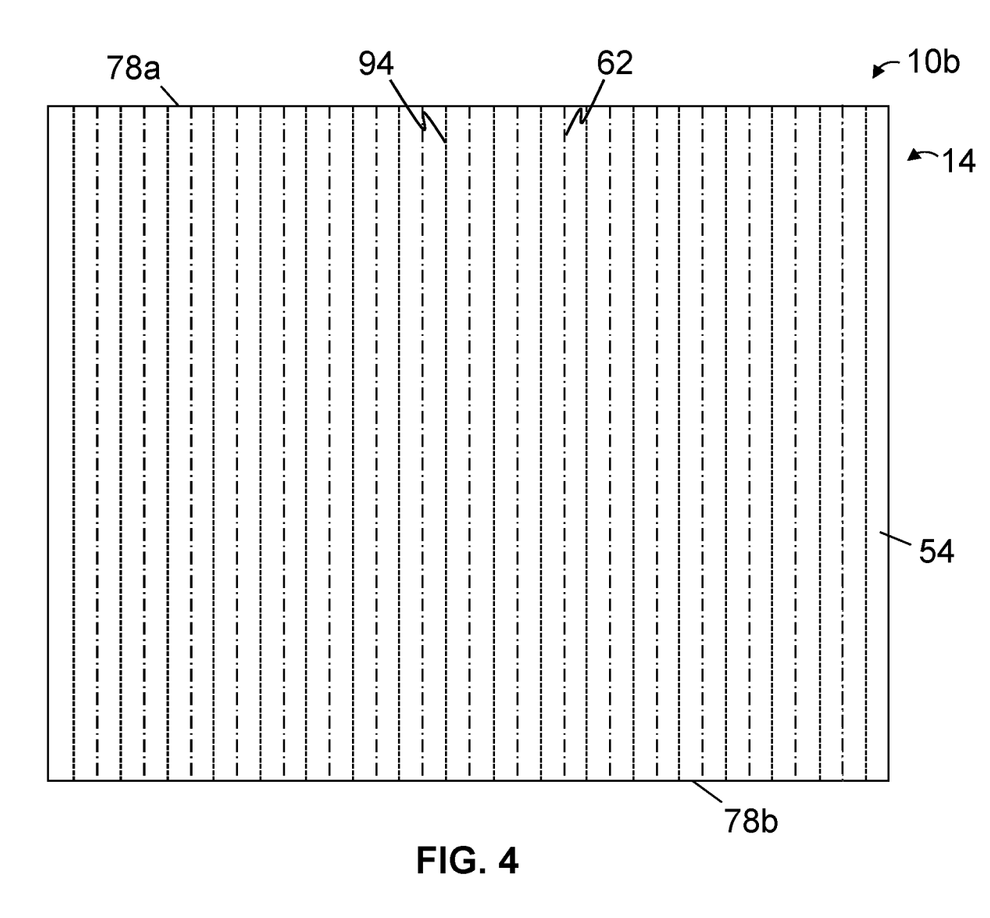
FIG. 4 is a top view of a second embodiment of the present sludge management systems, with some features depicted schematically.

Referring now to FIG. 4, shown therein and designated by the reference numeral 10*b* is a second embodiment of the present sludge management systems. System 10*b* is substantially similar to system 10*a*, with the primary exception being the configuration of one or more fluid passageways 62 and one or more fluid channels 94. For example, in the embodiment shown, one or more fluid passageways 62 each extend substantially parallel with one another between first edge 78*a* and second edge 78*b*. In this embodiment, one or more fluid channels 94 each extend substantially parallel with one another (e.g., and with one or more fluid passageways 62) between first edge 78*a* and second edge 78*b*.

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown may include some or all of the features of the depicted embodiment. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A sludge cover comprising:
 a supportive layer configured to be disposed over sludge, the supportive layer including a plurality of supportive panels, each comprising:
  upper and lower layers coupled together to define one or more cells therebetween;
  where at least one of the one or more cells contains foam; and
 a substantially fluid-impermeable layer configured to be disposed over the supportive layer.

2. The sludge cover of claim 1, comprising a mesh layer configured to be disposed between the sludge and the supportive layer.

3. The sludge cover of claim 1, where the substantially fluid-impermeable layer comprises a geomembrane.

4. The sludge cover of claim 1, where the substantially fluid-impermeable layer is disposed over the supportive layer.

5. The sludge cover of claim 4, comprising one or more weights placed on top of the substantially fluid-impermeable layer such that each of the one or more weights creates a depression in the top surface of the substantially fluid-impermeable layer, the depression(s) defining one or more fluid channels.

6. A method for covering sludge, the method comprising:
 disposing a plurality of mesh panels over the sludge to define a mesh layer; and
 disposing a substantially fluid-impermeable layer over the mesh layer.

7. The method of claim 6, where the substantially fluid-impermeable layer comprises a geomembrane.

8. The method of claim 7, comprising:
disposing a supportive layer over the mesh layer, the supportive layer defining one or more cells, at least one of the one or more cells containing foam;
where disposing the substantially fluid-impermeable layer over the mesh layer is performed such that the substantially fluid-impermeable layer is disposed over the supportive layer.

9. The method of claim 8, where disposing the supportive layer over the mesh layer comprises disposing a plurality of supportive panels, each defining at least one of the one or more cells, over the mesh layer to define the supportive layer.

10. The method of claim 9, where disposing the substantially fluid-impermeable layer over the mesh layer comprises disposing a plurality of substantially fluid-impermeable panels over the supportive layer to define the substantially fluid-impermeable layer.

\* \* \* \* \*